Sept. 13, 1932.   A. O. AUSTIN   1,876,579
INSULATOR
Filed Dec. 9, 1927

Witness:
H. J. Stromberger

Inventor
ARTHUR O. AUSTIN
By
Attorney

Patented Sept. 13, 1932

1,876,579

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

INSULATOR

Application filed December 9, 1927. Serial No. 238,917.

My invention relates to insulators and particularly insulators adapted to support conductors, such as bus bars.

The object of my invention is to provide a supporting device which will insulate the conductor from the ground or support, and which will permit gripping and holding the conductor in fixed relation with respect to the longitudinal center line or axis of the support.

Other objects will be disclosed as the description of my invention proceeds.

In the drawing accompanying this specification and forming a part thereof:

Figure 1:
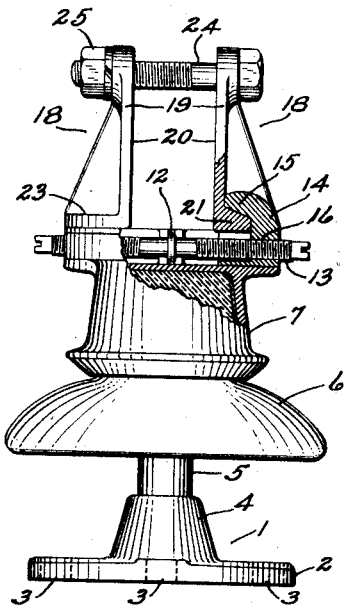
Fig. 1 is a side view in elevation of my invention, and with certain parts shown in partial section.
Figure 2:
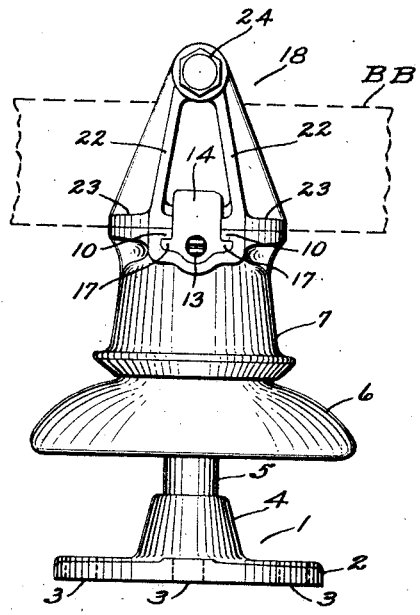
Fig. 2 is a side view of Fig. 1 at right angles to the view in Fig. 1.
Figure 3:
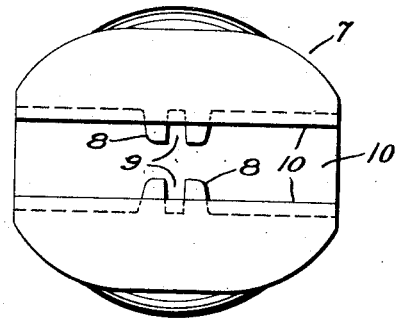
Fig. 3 is a top view of the cap member only.
Figure 4:
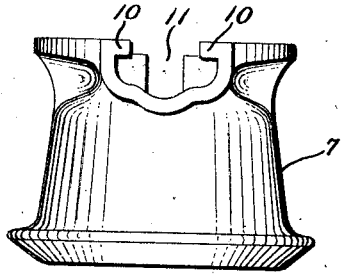
Fig. 4 is a side view of the cap member only and corresponds to the view in Fig. 2.
Figure 5:
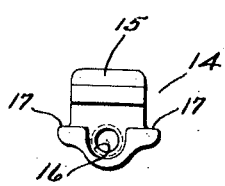
Fig. 5 is an end view of one of the clamping lugs.

In the preferred embodiment of my invention, I employ a base member 1 provided with a base flange 2 having openings 3 therein, through which pass bolts to secure the base to a support. Mounted upon the base flange 2 is a receptacle portion 4 and which is mounted and secured as by threading, welding or riveting a stem 5. Mounted upon the stem 5 is an inverted cup-shaped porcelain insulating member 6. Mounted upon the insulating member 6 is an inverted cup-shaped member 7.

The parts 1 and 7 are of metal and preferably secured to the insulating member 6 by a cemented joint, as is common and well known to those skilled in the art.

The cap member is provided with a transverse slot in its upper face and extending across the entire cap and having inwardly projecting lugs 8 which form a recess 9. The transverse slot on either end inwardly to the lugs 8 is of an inverted T-shaped formation having the flanges 10.

Mounted in the transverse slot 11 and with a centrally located collar 12 positioned in the slot 9 is a double ended screw 13 having right-hand threads at one end and left-hand threads at the other end. The lugs 8 engaging with the collar 12 prevent sidewise displacement of the screw 13. Slots are provided in the screw for the application of a screw driver or the ends may be squared and a socket key used to rotate the screw 13.

Slidably mounted in the slot 11 from either end are lugs 14 provided with an overhanging hook portion 15 to engage a clamping member and a threaded portion 16 to engage with the threads on one end of the screw 13.

The screw 13 is first positioned in the slot 11 and then the lugs 14 are applied in position with respect to the ends of the screw 13. The screw 13 is then rotated and as soon as the threads on the screw engage with the threads on the lugs 14, the continued rotation of the screw 13 will move the lugs toward each other. The lugs 14 are prevented from dis-engagement from their position in the slot 11 not only by their engagement with the screw 13, but by the wings 17 engaging with the flanges 10 on the cap.

Positioned upon the upper face of the cap and adjustable thereon, and independent of each, are clamping members 18 provided with an upright portion 19 having faces 20 to engage with the conductor or bus bar BB. Each clamping member is provided with a projecting portion 21 positioned between two side flanges 22 and which is engaged by the hook portion 15 on the lugs 14. The clamping members 18 are provided with further base portions 23 which rest upon the upper surface of the cap 7.

The upper ends of the clamping members 18 are provided with registered openings in which are positioned a clamping bolt 24 and a nut 25.

When the parts are assembled, as shown and described, and a bus bar BB is positioned between the faces 20 of the clamping members 18, the member 13 is rotated in the proper direction to remove and force the members 18 into clamping engagement with the bus bar. The bolt and nut 24 and 25 are then placed in position and the upper ends of the clamping members 18 will be drawn and held in close engagement with the bus bar.

With the bus bar in place, the clamping members 18 are held in fixed engagement with the bus bar and also with the cap 7 through the medium of the lugs 14.

The clamping members 18 are prevented from side movement due to the lugs 14 being positioned between the flanges 22.

It will be evident that without material change the members 14 and 18 can be formed integral and the operation of the screw 13 will then move the clamping members simultaneously in both directions.

Modifications of my invention disclosed herein are possible, and will be recognized by those skilled in the art, therefore, I wish to be limited only by my claims.

I claim:

1. A conductor support comprising a pair of fittings held in insulated relation by an interposed insulating member, a transverse groove in the face of one fitting, a rotatable screw mounted in the groove in the face of the said fitting, clamping members mounted on the face of the said fitting to receive a conductor therebetween and separate means operated by the screw to move toward each other and to grip the clamping members and hold them in fixed relation relative to the said fitting and to the conductor.

2. A conductor support comprising a base and conductor support secured together in insulated relation by an interposed insulating member, a pair of spaced clamping members mounted on the support to receive and clamp a conductor, lugs adapted to engage the clamping members to hold the members in contact with the conductor and to the support and interlocked with the members to prevent the members moving in the longitudinal direction of the conductor, means on the lugs to interlock with the support to prevent movement in the aforesaid direction and means to move the lugs toward each other.

3. In combination an insulated support having a flat upper surface provided with a groove therein, a clamping jaw resting on said surface and free to move thereon, a screw disposed in said groove, and a block slidably mounted in said groove and engaging said screw to be moved thereby when said screw is rotated, said block having a contact face thereon engaging said jaw to hold said jaw on said surface and to slide said jaw over said surface when said block is moved by said screw.

4. In combination an insulated support having a flat upper surface provided with a groove therein, a screw rotatably mounted in said groove, a pair of blocks slidably mounted in said groove and engaging said screw and arranged to be moved toward each other by said screw when said screw is rotated, and a pair of jaws resting on said surface, each of said slide blocks having means thereon for engaging one of said jaws to hold said jaw in position on said surface and to move said jaw along said surface when said block is moved by said screw.

5. In combination an insulated support having a flat upper surface and an undercut groove in said surface, a slide block dovetailed in said groove and having a hooked portion extending above said surface, threaded means for moving said slide block along said groove, and a clamping jaw resting on said surface and arranged to engage said hooked portion to be held thereby on said surface and to be moved by said block over said surface.

In testimony whereof I affix my signature.

ARTHUR O. AUSTIN.